United States Patent [19]
Paya

[11] Patent Number: 5,839,857
[45] Date of Patent: Nov. 24, 1998

[54] CUTTING INSERT

[75] Inventor: Jose Agustin Paya, Mülheim, Germany

[73] Assignee: Widia GmbH, Essen, Germany

[21] Appl. No.: 765,045

[22] PCT Filed: Apr. 21, 1995

[86] PCT No.: PCT/DE95/00552

§ 371 Date: Dec. 13, 1996

§ 102(e) Date: Dec. 13, 1996

[87] PCT Pub. No.: WO95/35178

PCT Pub. Date: Dec. 28, 1995

[30] Foreign Application Priority Data

Jun. 17, 1994 [DE] Germany .............................. 4422312.9

[51] Int. Cl.$^6$ .................................................. B23B 27/22
[52] U.S. Cl. ............................ 407/114; 407/116; 407/115
[58] Field of Search ..................................... 407/114, 115, 407/116, 117, 113

[56] References Cited

U.S. PATENT DOCUMENTS

| D. 304,949 | 12/1989 | Niebauer | 407/114 X |
| D. 305,239 | 12/1989 | Niebauer | 407/114 X |
| 4,487,534 | 12/1984 | Reiter | 407/114 |
| 5,147,159 | 9/1992 | Lowe et al. | 407/114 |
| 5,503,507 | 4/1996 | Lowe et al. | 407/114 |

FOREIGN PATENT DOCUMENTS

| 0 66 091 | 12/1982 | European Pat. Off. . |
| 0 278 083 A1 | 8/1988 | European Pat. Off. . |
| 0 579 963 A1 | 1/1994 | European Pat. Off. . |
| 41 28 065 a1 | 12/1992 | Germany . |
| 2 254 026 | 9/1992 | United Kingdom . |
| WO 92/21467 | 12/1992 | WIPO . |

Primary Examiner—Andrea L. Pitts
Assistant Examiner—Henry W. H. Tsai
Attorney, Agent, or Firm—Herbert Dubno; Andrew Wilford

[57] ABSTRACT

A cutting insert is formed with a cutting surface, a side surface joining the cutting surface at a cutting edge, and a wedge-shaped chip-shaping element formed on and raised above the cutting surface. The chip-shaping element has a width that increases uniformly away from the cutting edge, a pair of generally planar side flanks extending at an acute angle to each other, ascending away from the cutting surface away from the cutting edge, and defining a rounded upper edge extending toward the cutting edge, and a rear flank descending from the side flanks toward the cutting surface away from the cutting edge.

18 Claims, 5 Drawing Sheets

F I G. 1c
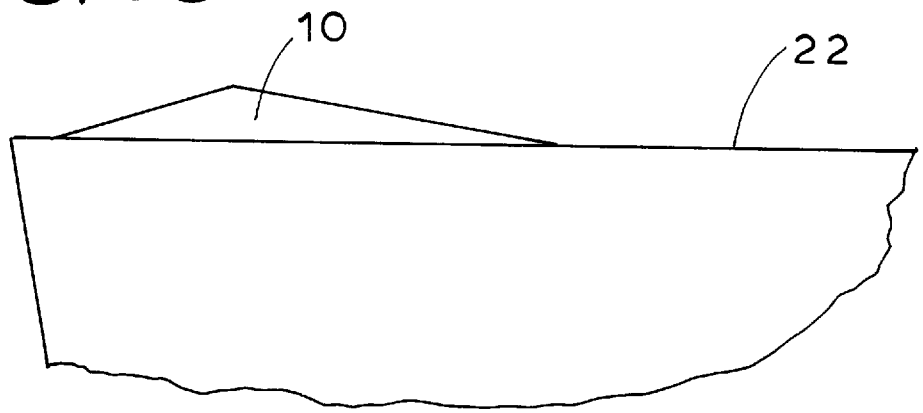
F I G. 1d
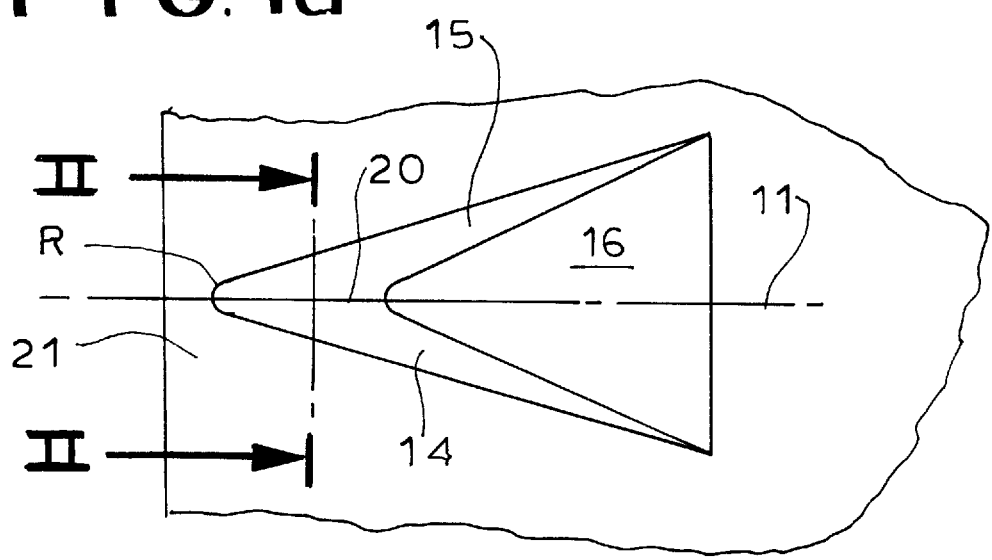
F I G. 1e
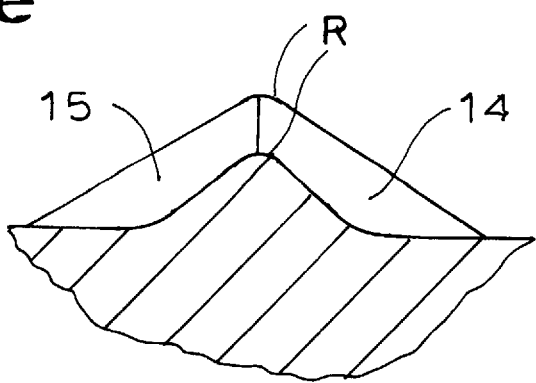

F I G. 2a
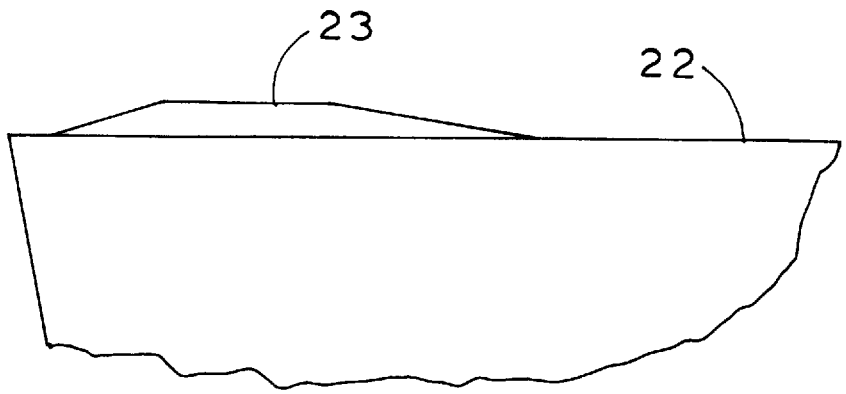
F I G. 2b
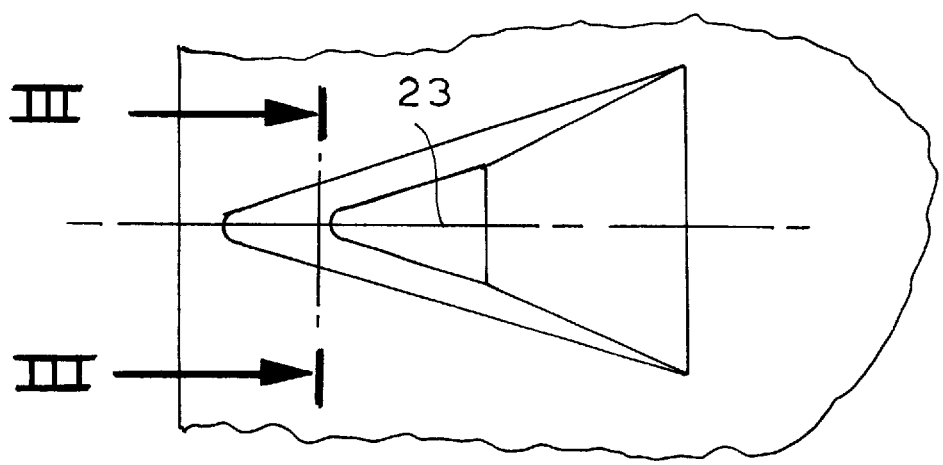
F I G. 2c
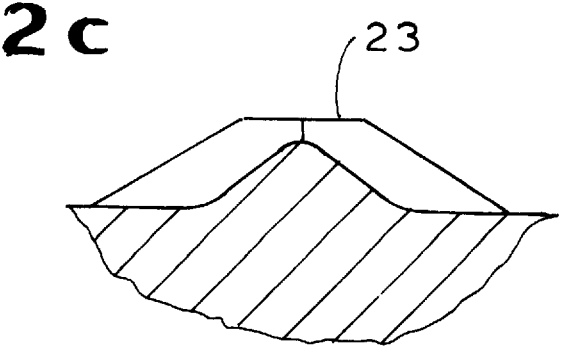

CUTTING INSERT

DESCRIPTION

CROSS REFERENCE TO RELATED APPLICATIONS

This application is the US national phase of PCT application PCT/DE95/00552 filed 21 Apr. 1996 with a claim to the priority of German application P 44 22 312.9 filed 17 Jun. 1994.

FIELD OF THE INVENTION

Cutting Insert

The invention relates to a cutting insert for machining having at least one top surface forming the cutting surface and peripheral side faces forming the free faces, the cutting surface having at least one raised chip-shaping element that extends as seen from above like a wedge toward the cutting edge.

BACKGROUND OF THE INVENTION

Cutting inserts with such chip-shaping elements are known for example from EP 0,066,091. The cutting inserts described there have at the cutting edge or the cutting corners a land of constant width behind which there is a steeply descending cutting surface region and a shallowly descending cutting-surface region. The chip-shaping elements lie in the last two cases on slightly descending cutting-surface regions. The chip-shaping element projects with its upper edge past the plane of the cutting edges or the cutting corners. The ascending surface is formed of curved side flanks that extend toward the cutting corner as a rounded region with a larger but not more closely defined radius of curvature.

OBJECTS OF THE INVENTION

It is an object of the present invention so to improve on the above-described type of cutting insert that, in machining operations wherein radically deformed chip cross sections are produced, the chip or the chip layers are separated from each other by the influence of a force from an element at a particular location so that the stable chip-cross section is weakened and the force exerted by the chip on the cutting insert is reduced.

SUMMARY OF THE INVENTION

This object is attained by a cutting insert according to claim 1 which is characterized in that the raised chip-shaping element has a width that increases uniformly away from the cutting edge along its longitudinal axis continuously in the region of ascending surfaces turned toward the cutting edge, the ascending surfaces being formed as generally planar side flanks which extend at an acute angle to each other, toward the cutting edge as well as upward, the upper edge being rounded along its full length, and a surface turned away from the cutting edge being formed as a descending flank and ending at the ascending surfaces.

Preferably the raised chip-shaping element not only locally lifts the passing chip from the cutting surface surrounding the element but also partially tears the passing layers of the chip transversely and longitudinally of the chip-travel direction to facilitate subsequent fracturing of the individual layers. The frictional forces that are produced are substantially less than in the known chip-shaping elements and the effect of the force on the cutting insert is reduced.

Preferably these raised chip-shaping elements can be combined with other also trough-shaped recesses of different cutting edge formations on cutting inserts with different geometries.

The angle of ascent of the upper edge measured longitudinally relative to the plane in which the cutting corners lie or relative to the cutting edge is between 10° and 45°, preferably 20° to 35°. The descending flank is a plane which has a negative angle of inclination of between 15° and 40°, preferably 15° to 30° relative to the plane in which the cutting corners lie or relative to the cutting edge. Experience has shown that optimal results are obtained when the side flanks seen from above form a wedge angle between 15° and 40°, preferably 20° to 30° and/or the radius of the rounded upper edge is between 0.1 mm and 0.5 mm. The length of the ascending flank seen from above at the upper edge is between 0.3 mm and 4 mm. In connection with the known angle of the ascending flank, this length is enough to effect the described layer separation with normal cut conditions. The chip-shaping element(s) are arranged at a spacing of between 0.05 mm and 1 mm, preferably 0.08 mm to 0.3 mm from the cutting edge. The chip-shaping elements are arranged with their longitudinal axes generally perpendicular to the adjacent cutting edge and positioned in the critical region of the chip cross section. The chip-shaping element has an upper surface parallel to an upper plane and to the cutting-edge plane and preferably produced by grinding. This top surface can serve as a mounting surface in particular in indexable cutting plates that are usable on both sides.

According to a further embodiment of the invention the cutting surface region immediately adjacent the cutting edge is formed as a descending flank, preferably forming the same angle as the descending flank of the chip-shaping element. Between the descending cutting-surface region and the cutting edge there is a land that extends preferably along the entire cutting edge and has a constant width. The land extends a positive angle or an angle of 0°. Similarly the cutting-surface central region is formed as a planar, recessed, or raised plateau and that the chip-shaping elements are arranged in a chip-shaping groove between a raise chip-shaping plateau and the cutting edge.

As already mentioned, the raised chip-shaping element according to the present invention can be combined with further trough-shaped chip-shaping elements, in particular with recesses, that have floors that extend at a negative cutting angle and a 0° cutting angle to the cutting edge, the cutting surface having in the region between the recesses and the cutting edges a positive cutting angle of at least 5° with the transitions from the negative cutting-surface floors toe the trapezoidal flanks and/or from trapezoidal flanks to the cutting surface regions surrounding the recess are rounded, preferably with a radius of 0.3 mm to 3 mm. Such recesses are described in WO/11993 to which reference is made specifically.

BRIEF DESCRIPTION OF THE DRAWING

Embodiments of the invention are shown in the drawings. Therein:

FIG. 1c is a partial side view of a cutting insert;

FIG. 1d is a top view of the partial view according to FIG. 1c; and

FIG. 1e is a sectional view taken along line II—II of FIG. 1d;

FIG. 2a is a side view of a part of an indexable cutting plate with an alternative embodiment of the chip-shaping element according to the invention;

FIG. 2b is a top view of the partial view of FIG. 2a; and

FIG. 2c is a section taken along line III—III of FIG. 2b;

FIG. 3b is a section taken along line IV—IV of FIG. 3a;

SPECIFIC DESCRIPTION

Figure 1A:
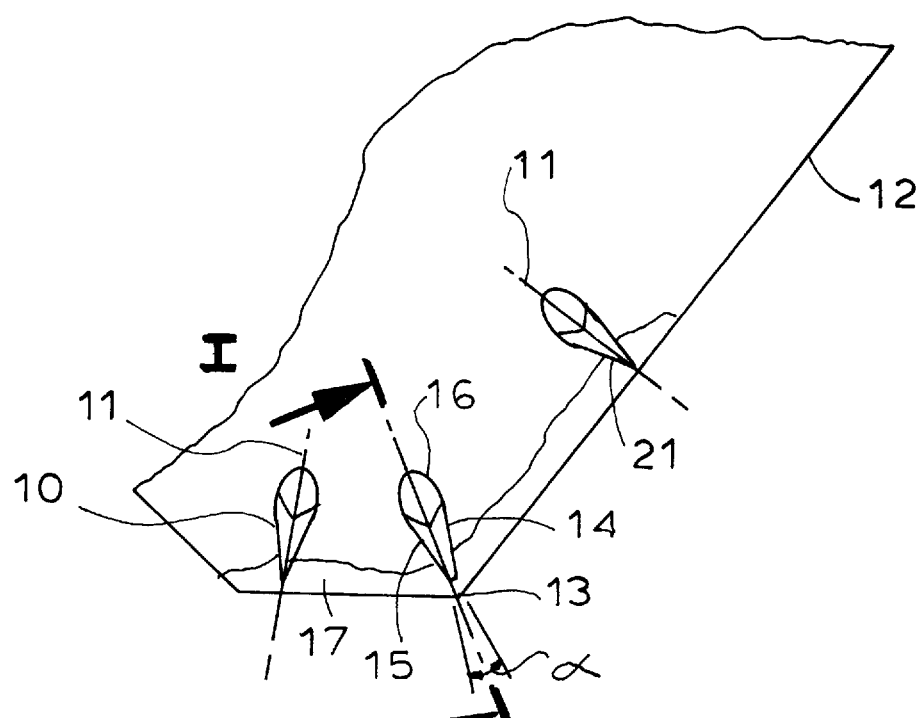
FIG. 1a is a top view of the relevant part of a cutting insert.

The raised chip-shaping element 10 is oriented with its longitudinal axis 11 either perpendicular to the cutting edge 12 or directed into a cutting corner 13. The chip-shaping element 10 has side flanks 14 and 15 that are turned toward the cutting edge 12 or the cutting corner and that are planar and form an apex angle α of 20° to 30°. A descending flank 16 is provided on the side away from the cutting edge. The region of the passing chip is shown at 17. As visible from FIG. 1b the cutting edge extends right up to a descending cutting-surface region 18 that itself extends up to a recessed central region 19. In this recessed region there are raised chip-shaping elements whose edges 20 formed by abutting side flanks are rounded. The descending flank 16 has an inclination β between 15° and 30° which also corresponds to the inclination of the descending flank 18. Side flanks 14 and 15 are rounded between 0.1 mm and 0.5 mm at its foot 21 or along the edge 20.

Figure 1B:
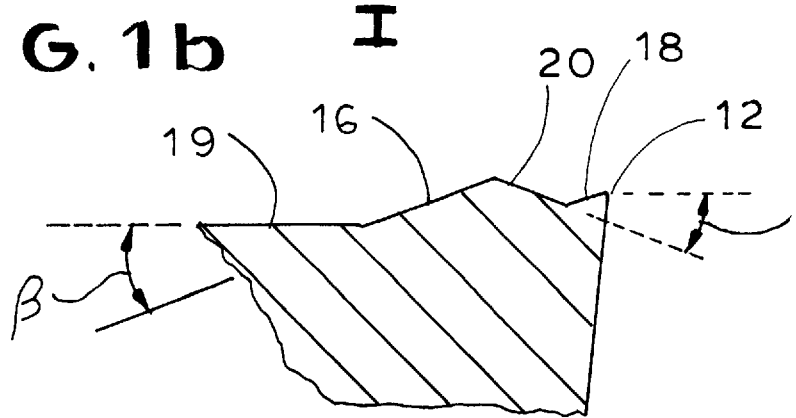
FIG. 1b is a section taken along line I—I.

As shown in FIG. 1c the chip-shaping element 10 is on a planar cutting surface 22. In cross section according to FIG. 1e the chip-shaping element is triangular with uniformly increasing width generally in the region of the ascending flank.

Figure 3E:
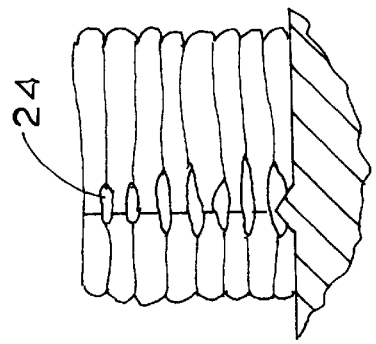
FIG. 3e is a similar sectional back view without the raised chip-shaping element.
Figure 3D:
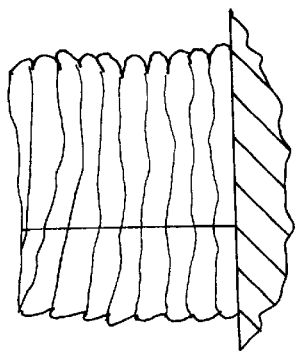
FIG. 3d is a sectional back view like FIG. 1e or 2c with the passing chip.
Figure 3A:
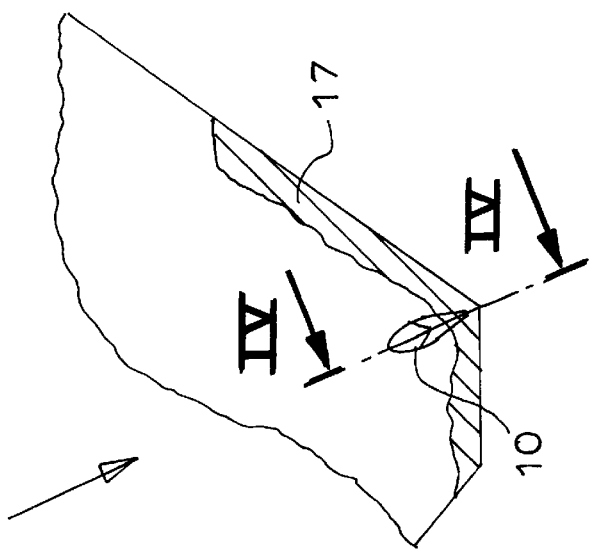
FIG. 3a is a top view of a part of a cutting insert during machining.
Figure 3B:
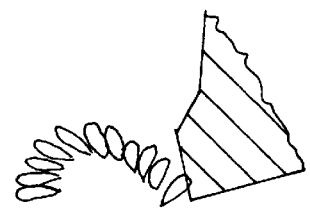
Figure 3C:
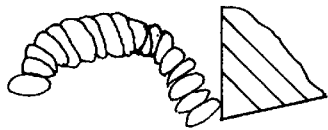
FIG. 3c is a section through an indexable cutting plate without the chip-shaping elements according to the invention.

The embodiment according to FIG. 2 is different from that of FIG. 1 because of an upper surface 23 which extends parallel to the cutting surface or a recessed cutting-surface center region or a raised cutting-surface center region. FIG. 3a shows the effect of the chip-shaping element 10 on a passing chip 17. Whereas as visible in FIGS. 3c and 3e the passing layered chip has its layers fused together, the passing chip according to FIGS. 3a, 3b, and 3d has partial holes 24, that is it is weakened or separated partly from layer to layer so that it can run along the cutting surface with little force.

Figure 4A:
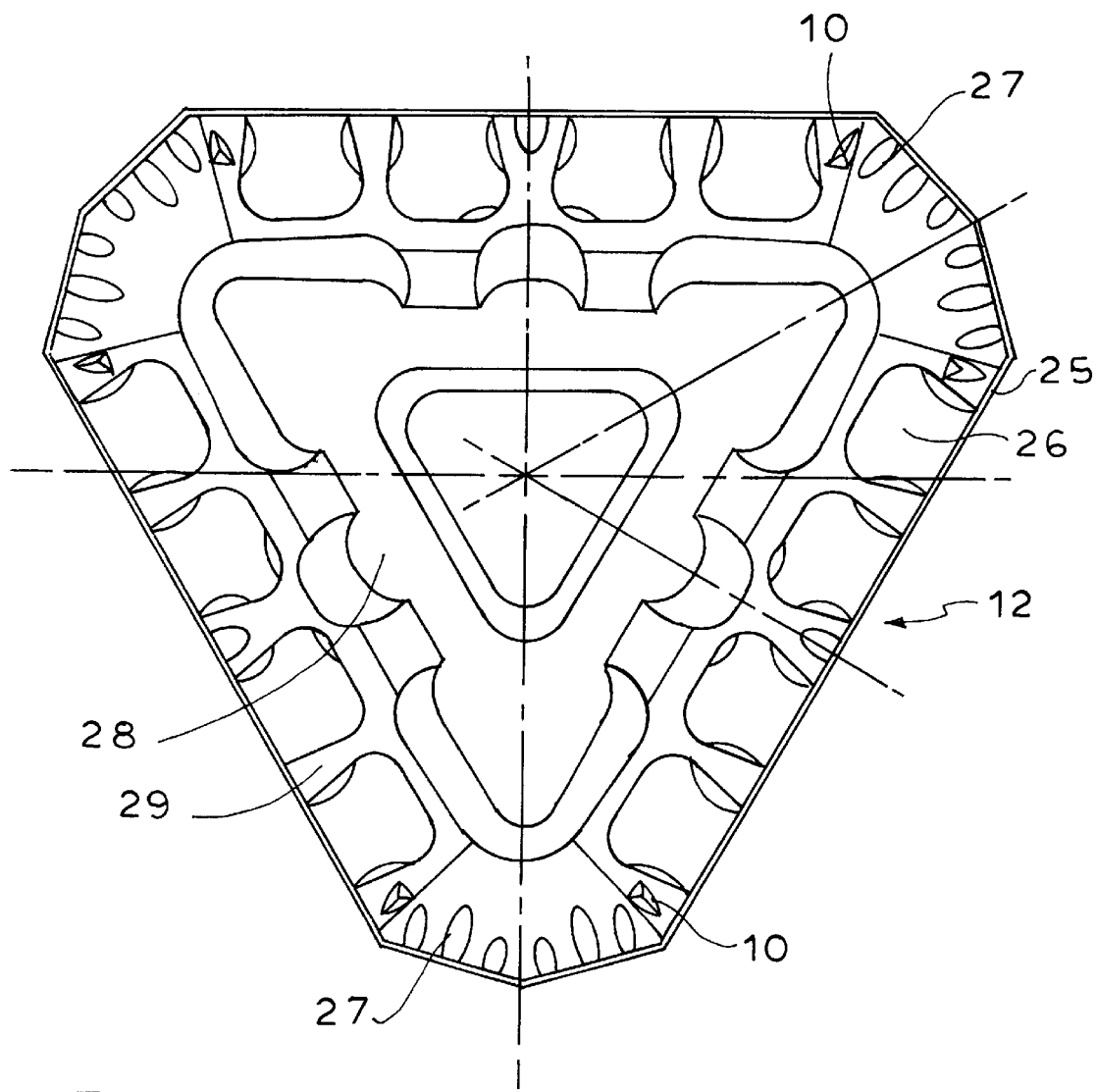
FIGS. 4a and 4b are respective views of an actual indexable cutting plate with groove-like recesses and raised chip-shaping elements in a top view and a partial view.
Figure 4B:
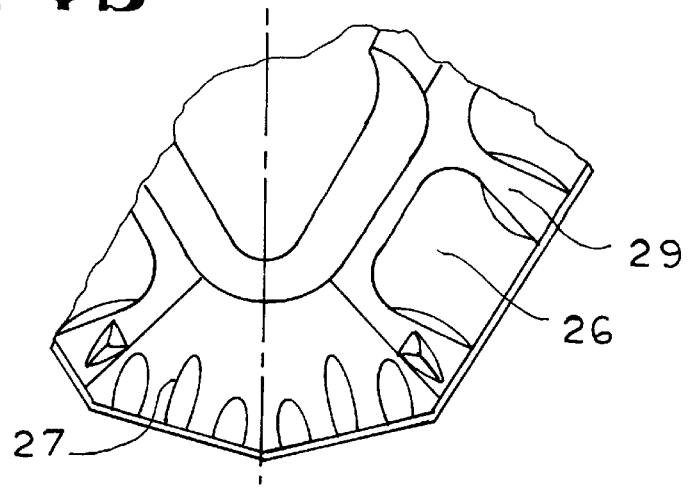

FIGS. 4a and 4b show actual uses of the chip-forming element in an indexable cutting insert. This cutting insert has a peripheral land 25 which is interrupted by recesses 26 which also extend into the cutting edge 12. Each cutting edge has four of these recesses which are described in detail in U.S. Pat. 5,688,081. Further trough-like recesses 27 of various length are provided in the region of the angled cutting edge and either extend right up to the land 25 or extend partially across it. These elongated-oval chip-shaping troughs 27 are flanked laterally by chip-shaping elements 10 followed after the next cutting corner by four respective trough-like recesses 26. All the known chip-shaping elements are formed in a chip-shaping groove 29 that is between the land 25 and a raised plateau 28. This plateau 28 has a shape that is generally triangular.

Improved cutting performance can also be achieved with round cutting inserts that are equipped with chip-shaping elements according to the invention.

I claim:
1. A cutting insert formed with:
   a cutting surface;
   a side surface joining the cutting surface at a cutting edge;
   a wedge-shaped chip-shaping element formed on and raised above the cutting surface and having
      a width that increases uniformly away from the cutting edge,
      a pair of generally planar side flanks extending at an acute angle to each other, ascending away from the cutting surface away from the cutting edge, and defining a upper edge extending toward the cutting edge and rounded along its full length, and
      a generally planar rear flank descending from the side flanks toward the cutting surface away from the cutting edge and forming with the cutting surface an angle of between 15° and 40°.

2. The cutting insert defined in claim 1 wherein the upper edge forms with the cutting surface an angle of between 10° and 45°.

3. The cutting insert defined in claim 1 wherein the upper edge forms with the cutting surface an angle of between 20° and 35°.

4. The cutting insert defined in claim 1 wherein the rear flank forms with the cutting surface an angle of between 15° and 30°.

5. The cutting insert defined in claim 1 wherein the side flanks have outer edges at the cutting surface forming an apex angle of between 15° and 40°.

6. The cutting insert defined in claim 1 wherein the side flanks have outer edges at the cutting surface forming an apex angle of between 20° and 30°.

7. The cutting insert defined in claim 1 wherein the upper edge is rounded along its full length at a radius of between 0.1 mm and 0.5 mm.

8. The cutting insert defined in claim 1 wherein the side flanks each has measured parallel to the surface and to the upper edge, a length of between 0.3 mm and 4 mm.

9. The cutting insert defined in claim 1 wherein the side flanks form a front point spaced by a distance of between 0.05 mm and 1 mm from the cutting edge.

10. The cutting insert defined in claim 1 wherein the side flanks form a front point spaced by a distance of between 0.08 mm and 0.3 mm from the cutting edge.

11. The cutting insert defined in claim 1 wherein the chip-shaping element has a longitudinal axis that extends substantially perpendicular to the cutting edge.

12. The cutting insert defined in claim 1 wherein the insert has two side surfaces forming a corner, the chip-shaping element having a longitudinal axis extending substantially as a bisector of the corner.

13. The cutting insert defined in claim 1 wherein the cutting surface is formed between the element and the cutting edge with a descending surface region extending substantially parallel to the rear flank.

14. The cutting insert defined in claim 13 wherein the cutting surface is formed between the descending surface region and the cutting edge with a peripheral land of uniform width.

15. The cutting insert defined in claim 14 wherein the land forms a positive cutting angle greater than 0°.

16. The cutting insert defined in claim 1 wherein the cutting surface has a central raised plateau and an edge groove, the element being in the edge groove.

17. The cutting insert defined in claim 1 wherein the insert is further formed with a trough-like chip-shaping element on the cutting surface.

18. The cutting insert defined in claim 17 wherein the insert is formed with a plurality of such trough-like chip-shaping elements forming negative cutting angles and the cutting surface forms between these trough-like chip-shaping elements a positive cutting angle of at least 5°, the cutting surface forming transitions at edges of the trough-like chip-shaping elements rounded to radii of between 0.3 mm and 3 mm.

* * * * *